United States Patent
Dunning

(10) Patent No.: US 7,145,319 B2
(45) Date of Patent: Dec. 5, 2006

(54) ELECTRICAL CONDUCTOR LOCATING DEVICE

(76) Inventor: William Herbert Dunning, P.O. Box 969 585 Logan Creek Rd., Boulder Creek, CA (US) 95006

( * ) Notice: Subject to any disclaimer, the term of this patent is extended or adjusted under 35 U.S.C. 154(b) by 0 days.

(21) Appl. No.: 11/131,754

(22) Filed: May 18, 2005

(65) Prior Publication Data

US 2005/0264274 A1 Dec. 1, 2005

Related U.S. Application Data

(60) Provisional application No. 60/575,058, filed on May 26, 2004.

(51) Int. Cl.
G01R 19/00 (2006.01)
G01R 33/00 (2006.01)
(52) U.S. Cl. .......................... 324/66; 324/67; 324/260; 324/263
(58) Field of Classification Search ............... 324/66, 324/67
See application file for complete search history.

(56) References Cited

U.S. PATENT DOCUMENTS

| | | | |
|---|---|---|---|
| 3,889,179 A * | 6/1975 | Cutler | 324/67 |
| 5,554,934 A * | 9/1996 | Ward et al. | 324/326 |
| 5,920,194 A * | 7/1999 | Lewis et al. | 324/67 |
| 6,541,977 B1 * | 4/2003 | Sneed et al. | 324/326 |
| 6,586,938 B1 * | 7/2003 | Paltoglou | 324/329 |
| 6,614,211 B1 * | 9/2003 | Douglas | 324/67 |
| 2004/0145486 A1 * | 7/2004 | Campbell et al. | 324/66 |

* cited by examiner

*Primary Examiner*—Anjan Deb
*Assistant Examiner*—Timothy J. Dole
(74) *Attorney, Agent, or Firm*—David Lewis; Jack Lo

(57) ABSTRACT

An electrical conductor locating device comprises a pulse generator and a detector. The pulse generator includes a transformer with outputs for connecting to two positions along the electrical conductor to define a closed loop. The current in the closed loop produces an electromagnetic field around the conductor. The detector is comprised of a magnetic field sensor coupled to the input of an amplifier. The output of the amplifier is connected to an indicator, such as a LED. When the sensor is moved perpendicularly closer to the conductor, it senses an increasing magnetic or electromagnetic field strength so the amplifier drives the indicator at greater intensity. When the sensor is directly aligned with the conductor, the sensor is inside the equipotential point of the magnetic or electromagnetic field where the field strength approaches zero, so the amplifier drives the indicator at close to zero intensity and thus pinpoints the conductor.

15 Claims, 1 Drawing Sheet

ELECTRICAL CONDUCTOR LOCATING DEVICE

CROSS REFERENCE TO RELATED APPLICATION

I claim the benefit of provisional patent application 60/575,058 filed on May 26, 2004.

BACKGROUND OF THE INVENTION

1. Field of the Invention

The invention broadly relates to magnetic or electromagnetic field detectors.

2. Prior Art

In the electrical or electronics field, sometimes it is necessary to find an electrical conductor in a specific part of a circuit among many other wires, or find a trace in a specific part of a circuit on a printed circuit board. Metal detectors are not suitable for this work because they are not capable of distinguishing a specific wire or trace among other wires or traces.

BRIEF SUMMARY OF THE INVENTION

An embodiment of a system described herein may detect the proximity of an electrical conductor, and may pinpoint a conductor in a specific part of an electrical circuit among other conductors nearby. An electrical conductor locating device comprises a pulse generator and a detector. The pulse generator includes a transformer with outputs for connecting to two positions along the electrical conductor to define a closed loop. The pulse generator produces an electromagnetic field around the conductor. The detector is comprised of a magnetic field sensor connected through a filter to the input of an amplifier. The output of the amplifier is connected to an indicator, such as a LED. When the sensor is moved perpendicularly closer to the conductor, it senses an increasing magnetic field strength so the amplifier drives the indicator at greater intensity. When the sensor is directly aligned with the conductor, the sensor is inside the equipotential point of the magnetic field where the field strength approaches zero, so the amplifier drives the indicator at close to zero intensity and thus pinpoints the conductor.

DETAILED DESCRIPTION OF THE INVENTION

Figure 1:
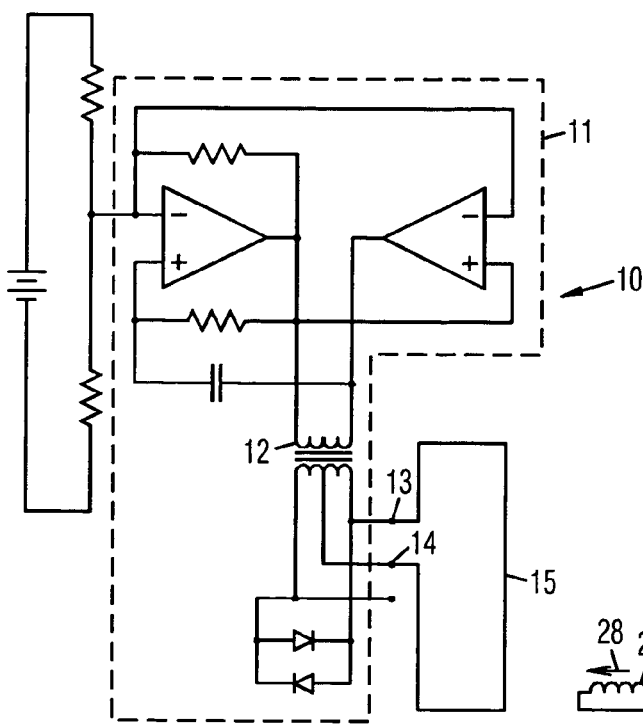
FIG. 1 is a circuit diagram of the pulse generator.
Figure 3:
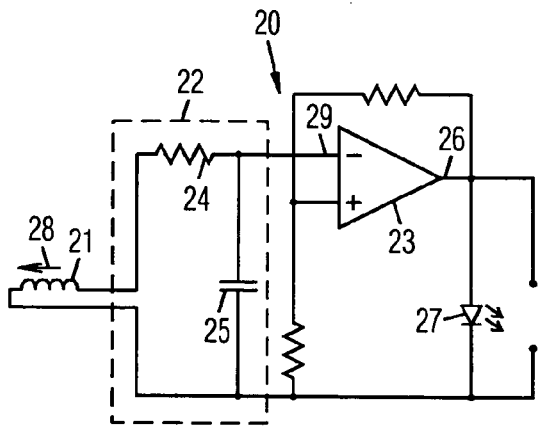
FIG. 3 is a circuit diagram of the detector.

An embodiment of an electrical conductor locating device comprises an electrical pulse generator 10 shown in FIG. 1 and a detector 20 shown in FIG. 3.

Figure 2:
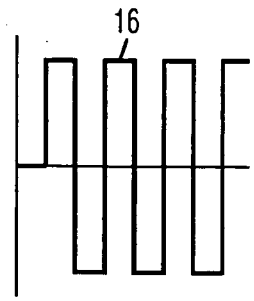
FIG. 2 is a graph of a pulse generated by the pulse generator.

In FIG. 1, pulse generator 10 comprises a full-bridge regenerative circuit 11 that drives an audio frequency transformer 12 with symmetrical, complimentary pulses. Outputs 13 and 14 of transformer 12 are for connecting to any two points on an electrical conductor 15 under test. Conductor 15 is comprised of any conductor in an electrical or electronic circuit, such as a wire inside a wall, a wire in a bundle of wires, or a trace on a printed circuit board. Transformer 12 delivers low impedance, low voltage pulses 16 of typically 400 mV as shown in FIG. 2 to conductor 15.

Pulse generator 10 may be comprised of any suitable device which generates pulses for conductor 15. For example, pulse generator 10 may be comprised of a power generating station which delivers 110–220 VAC at 50–60 Hz, in which case conductor 15 is comprised of domestic AC power wiring with a load drawing enough current through conductor 15 to be detected.

In FIG. 3, detector 20 comprises a magnetic field sensor 21 connected through a band-pass or low-pass filter 22 to an amplifier 23, such as a bipolar, current source input operational amplifier or op-amp. Sensor 21 comprises a coiled wire, such as an axial, solenoid type, high permeability, ferromagnetic pickup, or an air core inductor. Filter 22 comprises a resistor 24 and a capacitor 25 for reducing noise. Output 26 of amplifier 23 is connected to an indicator 27, such as a lamp or LED. Alternatively, indicator 27 may be a speaker, an oscilloscope, etc. A bias current 28 flows through ferromagnetic sensor 21 from an input 29 of amplifier 23 (FIG. 3) at a level that magnetizes sensor 21 without saturating it.

Figure 4A:
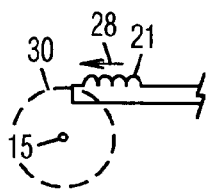
FIG. 4A shows a sensor of the detector moving into a magnetic field of a conductor under test.

FIGS. 4A–4D show the operation of the device. In FIG. 4A, conductor 15 is shown in an end sectional view. The pulses delivered to conductor 15 by pulse generator 10 produce an electromagnetic field 30 with a spatial symmetry gradient of the $1/r^2$ logarithm around conductor 15.

In FIG. 4A, when sensor 21 moves perpendicularly into the proximity of conductor 15, magnetic field 30 changes the permeability of sensor 21 and modulates bias current 28 through magnetic induction. Indicator 27 is thus activated by the proximity of conductor 15.

Figure 4B:
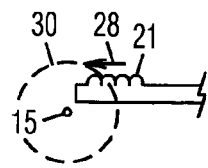
FIG. 4B shows the sensor moving closer to the conductor under test.

In FIG. 4B, when sensor 21 moves closer to conductor 15, sensor 21 detects the increased field strength and output 26 of amplifier 23 increases to drive indictor 27 at greater intensity.

Figure 4C:
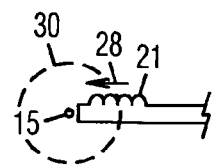
FIG. 4C shows the sensor directly aligned with the conductor under test.

In FIG. 4C, when sensor 21 moves to a center or equipotential point of magnetic field 30, the permeability of sensor 21 ceases to change, which creates a null at input 29 of amplifier 23 and no output to indicator 27.

Figure 4D:
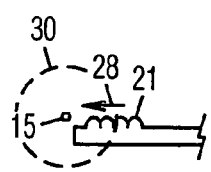
FIG. 4D shows the sensor moving away from the conductor under test.

In FIG. 4D, when sensor 21 moves away from conductor 15, sensor 21 again detects magnetic field 30 so indicator 27 is activated again.

Therefore, activation of indicator 27 indicates proximity of conductor 15, and deactivation of indicator 27 between positions of maximum intensity pinpoints the precise location of conductor 15. The electrical conductor locating device is thus useful for finding hidden conductors, and for finding a conductor in a specific part of an electrical circuit among other conductors nearby.

Figure 5:
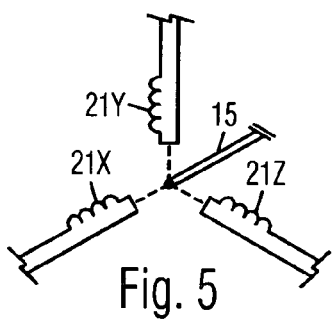
FIG. 5 shows another embodiment with 3-axis sensors.

FIG. 5 shows another embodiment with 3-axis sensors 21X, 21Y, and 21Z in separate detector circuits for precisely locating conductor 15 in three dimensions.

Figure 6:
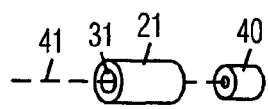
FIG. 6 shows another embodiment with a laser alignment indicator.

FIG. 6 shows another embodiment wherein sensor 21 is cylindrical with a through-hole 31, and further includes a laser 40 which shines a laser beam 41 along an axis of through-hole 31 to visually pinpoint the location of the conductor.

Although the foregoing description is specific, it should not be considered as a limitation on the scope of the invention, but only as an example of an embodiment. Many variations are possible within the teachings of the invention. Therefore, the scope of the invention should be determined by the appended claims and their legal equivalents, not by the examples given.

I claim:

1. An electrical conductor locating device, comprising:
   an amplifier;
   a magnetic field sensor including at least a coiled wire connected to an input of the amplifier;
   an indicator connected to an output of the amplifier, wherein the amplifier is arranged to activate the indicator when the sensor is moved into proximity of the conductor, and to deactivate the indicator when the sensor is moved to a generally equipotential point of the electromagnetic field around the conductor; and
   a laser aligned with a through-hole in the sensor for directing a laser beam through the through-hole.

2. The electrical conductor locating device of claim 1, wherein the amplifier comprises an op-amp.

3. The electrical conductor locating device of claim 1, wherein the indicator comprises a lamp.

4. The electrical conductor locating device of claim 1, further including a filter connected between the sensor and the input of the amplifier.

5. The electrical conductor locating device of claim 1, further including additional magnetic field sensors in a 3-axis arrangement for pinpointing the conductor in three dimensions.

6. An electrical conductor locating device, comprising:
   an electrical pulse generator for connecting to an electrical conductor, wherein the generator is arranged for delivering pulses to the conductor and producing an electromagnetic field around the conductor; and
   a detector including at least
      a magnetic field sensor connected to an input of an amplifier,
      an indicator connected to an output of the amplifier, wherein the amplifier is arranged to activate the indicator when the sensor is moved into proximity of the conductor, to deactivate the indicator when the sensor is moved to a generally equipotential point of the electromagnetic field around the conductor, and
      a laser aligned with a through-hole in the sensor for directing a laser beam through the through-hole.

7. The electrical conductor locating device of claim 6, wherein the pulse generator includes a transformer with outputs for connecting to the conductor to define a closed loop.

8. The electrical conductor locating device of claim 6, wherein the amplifier comprises an op-amp.

9. The electrical conductor locating device of claim 6, wherein the indicator comprises a lamp.

10. The electrical conductor locating device of claim 6, further including a filter connected between the sensor and the input of the amplifier.

11. The electrical conductor locating device of claim 6, further including additional magnetic field sensors in a 3-axis arrangement for pinpointing the conductor in three dimensions.

12. An electrical conductor locating device, comprising:
    an electrical pulse generator with a transformer with outputs for connecting to an electrical conductor to define a closed loop, wherein the generator is arranged for delivering pulses to the conductor and producing an electromagnetic field around the conductor; and
    a detector including at least
       a coiled wire connected through a filter to an input of an amplifier,
       an indicator connected to an output of the amplifier, wherein the amplifier is arranged to activate the indicator when the coiled wire is moved into proximity of the conductor, and to deactivate the indicator when the coiled wire is moved to a generally equipotential point of the electromagnetic field around the conductor, and
       a laser aligned with a through-hole in the sensor for directing a laser beam through the through-hole.

13. The electrical conductor locating device of claim 12, further including additional magnetic field sensors in a 3-axis arrangement for pinpointing the conductor in three dimensions.

14. A system comprising:
    a sensor for sensing an electromagnetic field, wherein the sensor has a through-hole;
    an indicator for indicating that the sensor senses the electromagnetic field, wherein the indicator is deactivated when an equipotential point of the electromagnetic field is found;
    a beam source aligned with the through-hole in the sensor for shining a beam through the through-hole, wherein the sensor and the beam source are configured such that when the equipotential point of the electromagnetic field is reached, a direction associated with the beam is indicative of information associated with a location of a source of the electromagnetic field.

15. A method comprising:
    sensing an electromagnetic field, via a sensor that has a though-hole;
    in response to the sensing, sending a signal to an indicator that activates the indicator; deactivating the indicator in response to moving the sensor into an equipotential in the electromagnetic field; and
    shining a beam through the through-hole within the sensor, wherein when the equipotential point in the electromagnetic field is reached by the sensor, a direction associated with the beam is indicative of information associated with a location of a source of the electromagnetic field.

* * * * *